(12) United States Patent
Harriger (10) Patent No.: US 11,395,952 B2
(45) Date of Patent: Jul. 26, 2022

(54) LASER FOOTBALL DOWN MARKER SYSTEM AND METHOD

(71) Applicant: John Harriger, Bedford, VA (US)

(72) Inventor: John Harriger, Bedford, VA (US)

( * ) Notice: Subject to any disclaimer, the term of this patent is extended or adjusted under 35 U.S.C. 154(b) by 410 days.

(21) Appl. No.: 16/746,902

(22) Filed: Jan. 19, 2020

(65) Prior Publication Data

US 2021/0220720 A1    Jul. 22, 2021

(51) Int. Cl.
*A63B 71/06* (2006.01)
*G01C 9/02* (2006.01)
*G01S 17/08* (2006.01)

(52) U.S. Cl.
CPC ............... *A63B 71/06* (2013.01); *G01C 9/02* (2013.01); *G01S 17/08* (2013.01); *A63B 2071/0694* (2013.01); *A63B 2220/805* (2013.01); *A63B 2243/007* (2013.01)

(58) Field of Classification Search
CPC ............ A63B 71/06; A63B 2071/0694; A63B 2220/805; A63B 2243/007; G01C 9/02; G01S 17/08
See application file for complete search history.

(56) References Cited

U.S. PATENT DOCUMENTS

| 4,090,708 | A | * | 5/1978 | McPeak | A63C 19/08 473/470 |
| 6,907,840 | B1 | * | 6/2005 | Gaines | A63B 71/0605 116/222 |
| 2019/0120960 | A1 | * | 4/2019 | Koga | G01S 7/4876 |

* cited by examiner

*Primary Examiner* — Corbett B Coburn
(74) *Attorney, Agent, or Firm* — Lyman Moulton, Esq.; Moulton Patents, PLLC (57) ABSTRACT

A football down marker system, including a first pole bearing a first laser, a first multilayer reflector, a first level and a first processor. The system also includes a second pole bearing a second laser, a second multilayer reflector, a second level and a second processor, wherein the first laser is complementary to the second multilayer reflector and the second laser is complementary to the first multilayer reflector, and wherein each processor calculates an average distance between a respective laser and its complementary multilayer reflector, and wherein each processor calculates a difference between a laser incidence on a first layer versus incidence on a second layer of the multilayer reflectors to determine a line of sight by a coincidence of the incidence.

20 Claims, 8 Drawing Sheets

LASER FOOTBALL DOWN MARKER SYSTEM AND METHOD

BACKGROUND OF THE INVENTION

At least five different first down measurement devices have received patents distinct from the 'chain gang' but also distinct from each other, yet the chain gang stubbornly continues use on most football fields.

1954: Lou Peresenyi invents the Pere-Scope, which is used in 21 college football games. 1955: The Pere-Scope is used in the East-West Shrine Game. 1958: Peresenyi receives a patent for the Pere-Scope.

1959: Henry R. Clime is granted a patent for "a novel instrument for sighting the exact position of the football on every down." The invention is used the following year for a Colts intersquad game.

1960: An aerospace and automotive engineer named George Dicker watches a college football game played on a muddy field, notices the officials having a difficult time measuring first downs, and thinks to himself, "There must be a better way." He will spend the next decade pondering this question.

1966: Theodore Goff and several associates receive a patent for "a visual instrument for use in determining the exact position of a football on a playing field," which they say has been successfully used at the high school and college levels.

1970: *The Los Angeles Times* publishes an article about George Dicker, who after 10 years has invented his device for measuring first downs, called the Dickerod. "Really," he says, "my method is essentially the same as the chain gang. I've just eliminated the chain and the gang." 1972: Dickerod business is booming, as Dicker has made 250 of the devices and claims they'll be used in over 600 games during the '72 football season, mostly at the high school level. 1973: George Dicker receives a patent for the Dickerod, described as a device "concerned with the measurement of the ten yard distance required in football games for the achievement of a first down, and the accomplishment of this measurement by one person." 1974: The World Football League begins play using the Dickerod to measure first downs.

1993: Alvin J. Caywood receives a patent for "a device for measuring the position of a football on a football playing field." It's not clear whether this invention ever ends up being used in a game at any level.

SUMMARY OF THE INVENTION

A football down marker system, including a first pole bearing a first laser, a first multilayer reflector, a first level and a first processor. The system also includes a second pole bearing a second laser, a second multilayer reflector, a second level and a second processor, wherein the first laser is complementary to the second multilayer reflector and the second laser is complementary to the first multilayer reflector, and wherein each processor calculates an average distance between a respective laser and its complementary multilayer reflector, and wherein each processor calculates a difference between a laser incidence on a first layer versus incidence on a second layer of the multilayer reflectors to determine a line of sight by a coincidence of the incidence.

A method for determining football yardage, including bearing a first laser, a first multilayer reflector, a first level and a first processor on a first pole and bearing a second laser, a second multilayer reflector, a second level and a second processor on a second pole. The method also includes disposing the first laser complementary to the second multilayer reflector and the second laser complementary to the first multilayer reflector. The method additionally includes calculating an average distance between a respective laser and its complementary multilayer reflector via a processor.

Other aspects and advantages of embodiments of the disclosure will become apparent from the following detailed description, taken in conjunction with the accompanying drawings, illustrated by way of example of the principles of the disclosure.

Throughout the description, similar and same reference numbers and lines used in one figure may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

Throughout the present disclosure, the term "laser" refers to both to the laser itself and to laser rangefinder components such as receivers and conventional reflectors.

Figure 1:
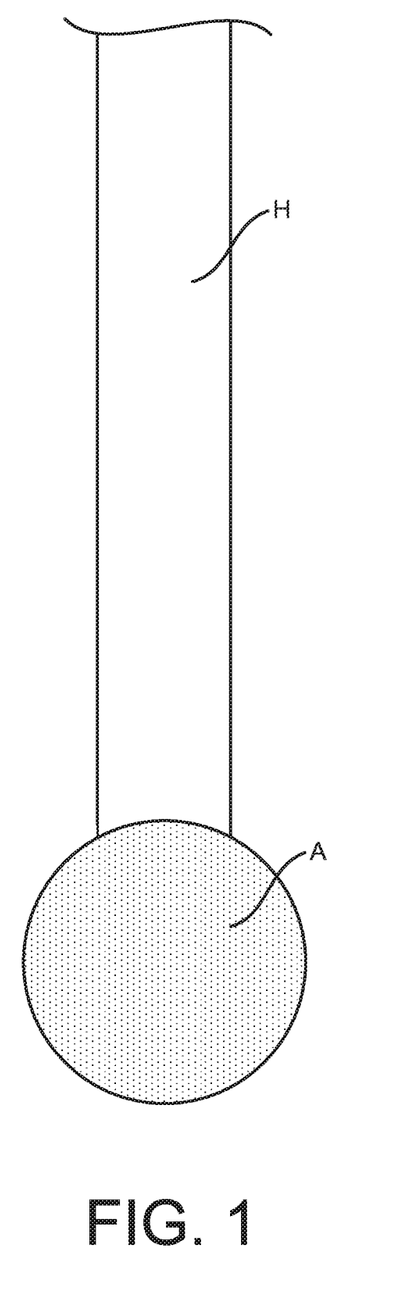
FIG. 1 depicts a laser football down marker bottom portion in accordance with an embodiment of the present disclosure.

FIG. 1 depicts a laser football down marker bottom portion in accordance with an embodiment of the present disclosure. The depiction includes the marker bottom A and the pole H. The bottom A may be oriented parallel to the pole or orthogonally to the pole (see FIG. 7).

Figure 2:
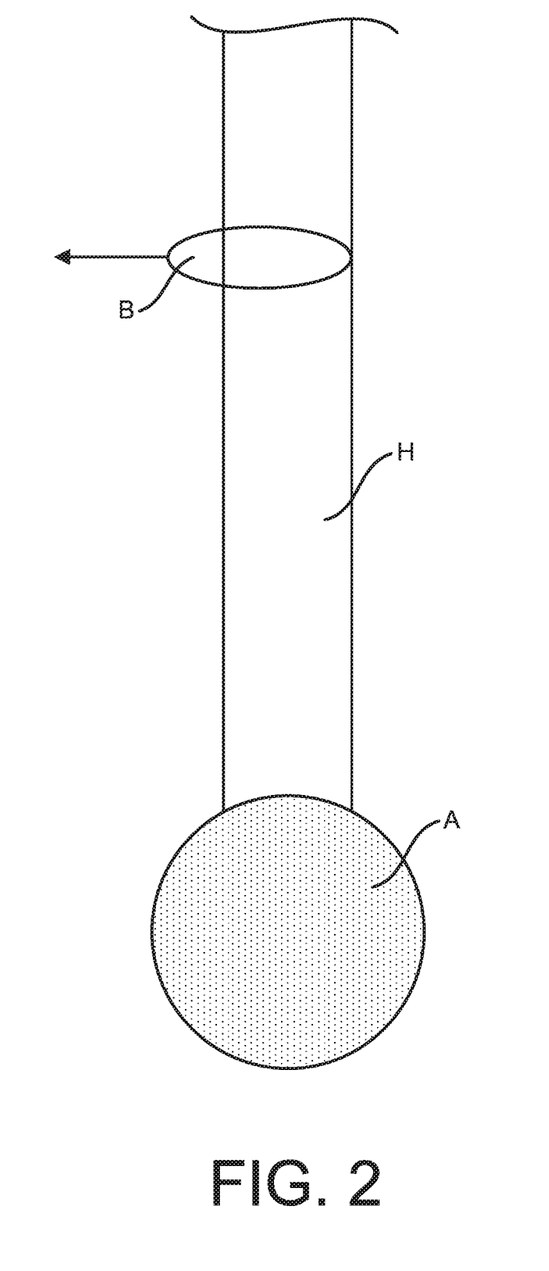
FIG. 2 depicts a laser football down marker bottom portion with laser in accordance with an embodiment of the present disclosure.

FIG. 2 depicts a laser football down marker bottom portion with laser in accordance with an embodiment of the present disclosure. The laser B includes conventional rangefinder hardware for determining a distance of travel calculated by a time it takes a beam of laser light to travel a known distance.

Figure 3:
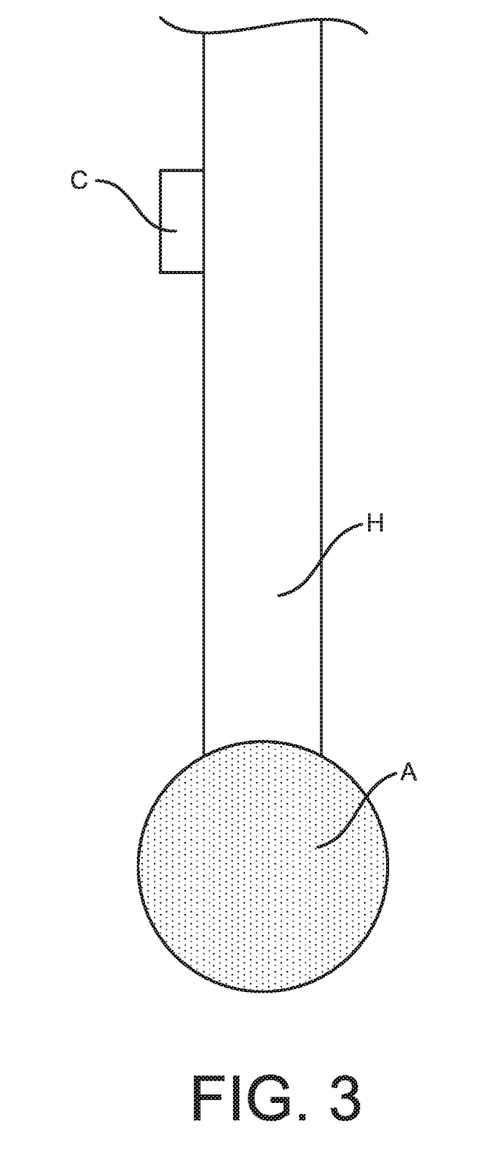
FIG. 3 depicts a laser football down marker bottom portion with level in accordance with an embodiment of the present disclosure.

FIG. 3 depicts a laser football down marker bottom portion with level in accordance with an embodiment of the present disclosure. The level C indicates if a line of sight between two poles H will enable the laser B to find its target on another rangefinder or on the multilayer reflector complementary to a respective laser.

Figure 4:
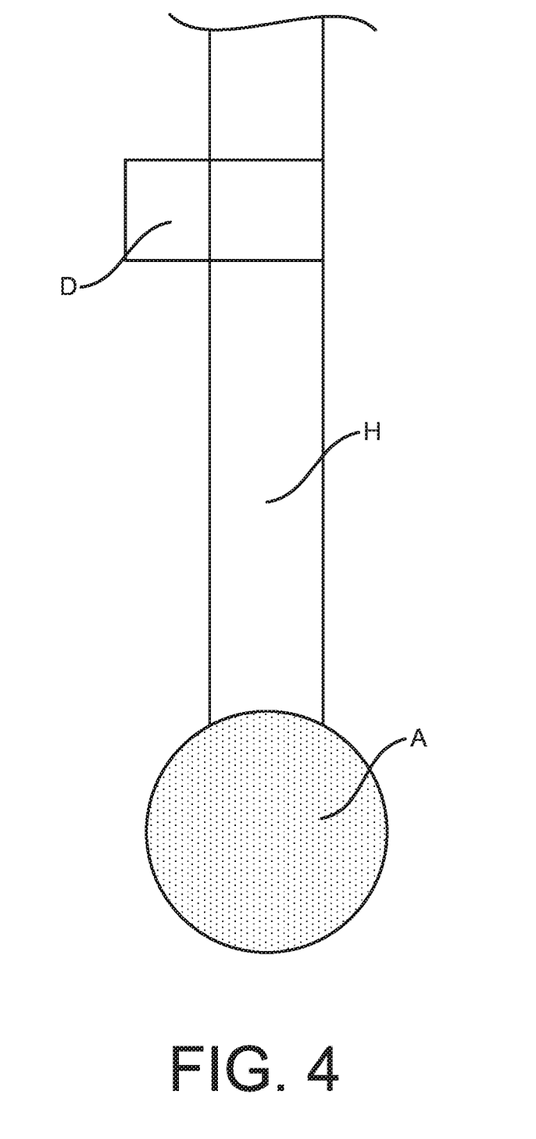
FIG. 4 depicts a laser football down marker bottom portion with laser stop plate in accordance with an embodiment of the present disclosure.

FIG. 4 depicts a laser football down marker bottom portion with laser stop plate in accordance with an embodiment of the present disclosure. The stop plate D is a multilayer reflector and a laser receiving detecting sensor. Depending on an accuracy desired in the laser rangefinder distance, multiple rounds back and forth may be measured to increase an average deviation to sigma requirements.

Figure 5:
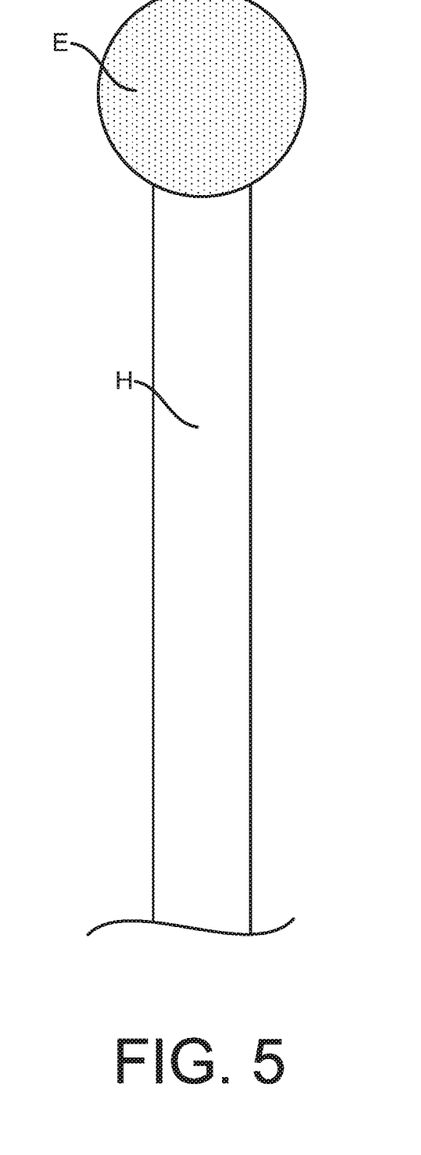
FIG. 5 depicts a laser football down marker top portion with advertisement in accordance with an embodiment of the present disclosure.

FIG. 5 depicts a laser football down marker top portion with advertisement in accordance with an embodiment of the present disclosure. The advertisement E on the pole H may be located at will according to rules and or requirements of the host or sponsor. The flat stock shown is capable of being electronic or print of three dimensions or two.

Figure 6:
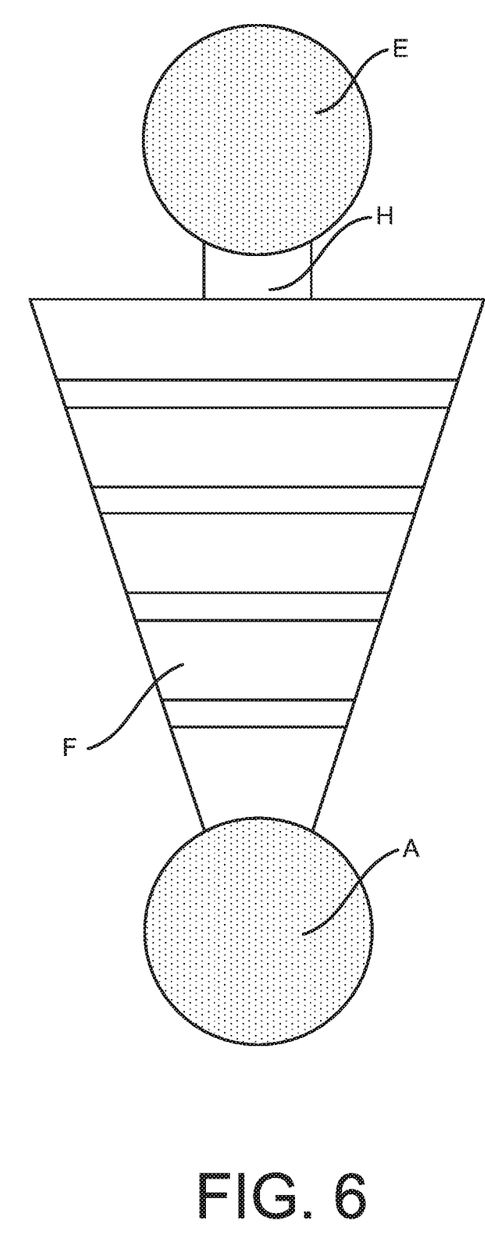
FIG. 6 depicts a laser football down marker with a triangular flip sign in accordance with an embodiment of the present disclosure.

FIG. 6 depicts a laser football down marker with a triangular flip sign in accordance with an embodiment of the present disclosure. The flip sign F indicates a down number by flipping to another face along a top horizontal hinge or fold along any intersection of faces. He pole H supports the bottom plate, flip sign, advertisement and technical hardware including the laser rangefinder, multilayer reflectors and level.

Figure 7:
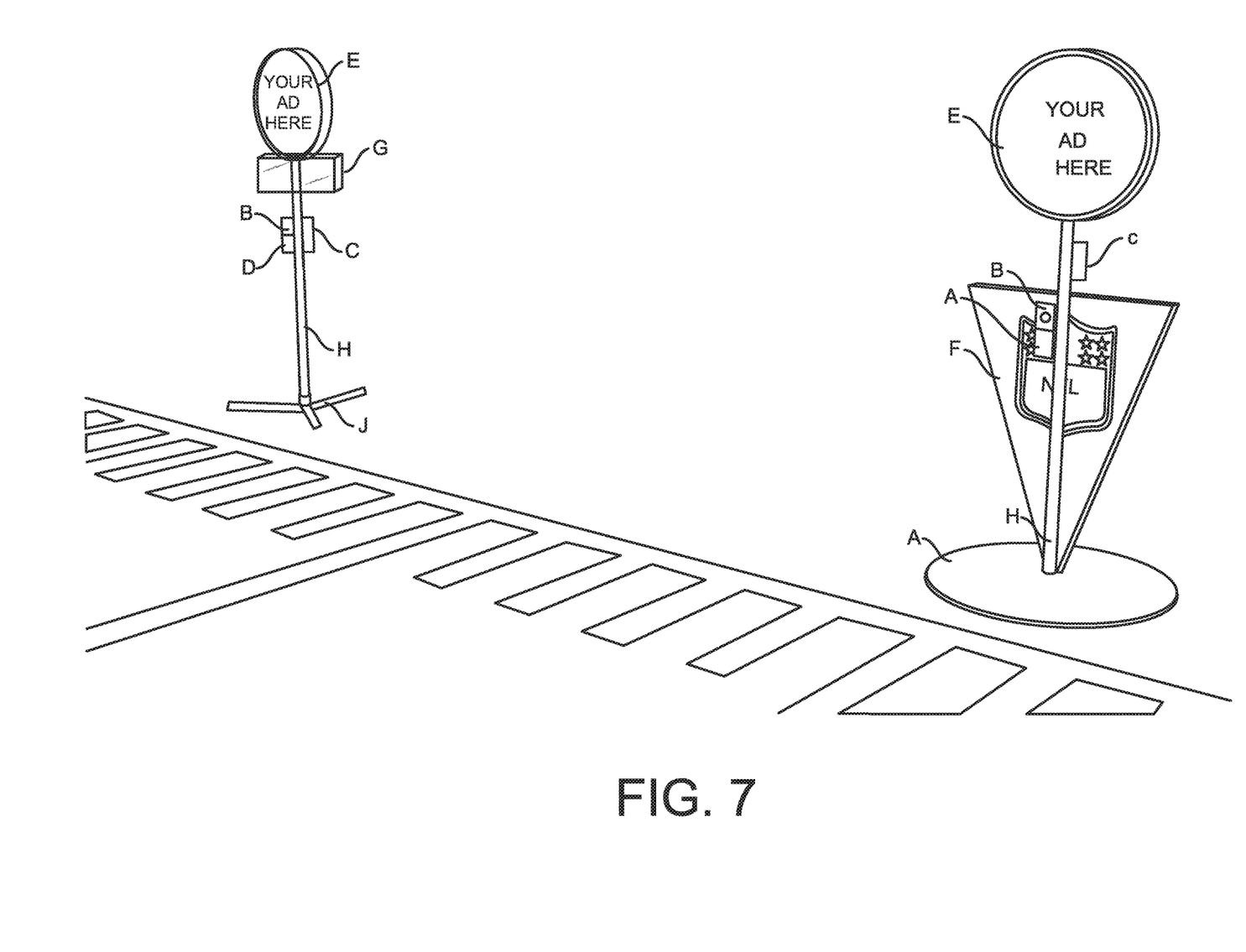
FIG. 7 depicts two laser football down markers in accordance with an embodiment of the present disclosure.

FIG. 7 depicts two laser football down markers in accordance with an embodiment of the present disclosure. The limitations of each laser down marker are referenced in the above drawings including the base A, the laser rangefinder B, the level C, the stop plate or multilayer reflector D, the advertisement E, the flip sign F, an alternative flip sign G and the pole H and tripod foot J. The two poles are complementary to each other in terms of respective laser rangefinder lasers and receivers and may fire back and forth between each other or one fire and the other receive. Four poles and respective hardware are also used on both sides of a field of play for distributed accuracy.

Figure 8:
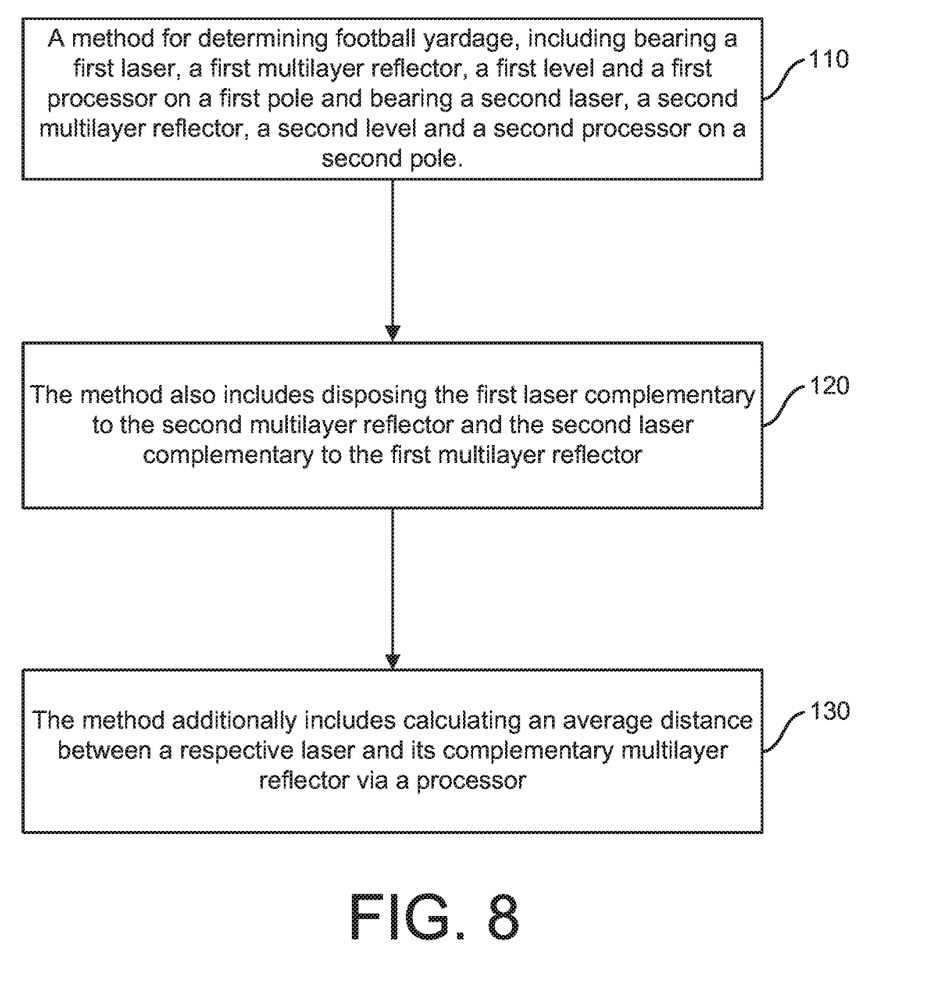
FIG. 8 is a flow chart of a method of demarking football downs via the laser football marker in accordance with an embodiment of the present disclosure.

FIG. 8 is a flow chart of a method of demarking football downs via the laser football marker in accordance with an embodiment of the present disclosure. The method for determining football yardage, includes bearing 110 a first laser, a first multilayer reflector, a first level and a first processor on a first pole and bearing a second laser, a second multilayer reflector, a second level and a second processor on a second pole. The method also includes disposing 120 the first laser complementary to the second multilayer reflector and the second laser complementary to the first multilayer reflector. The method additionally includes calculating 130 an average distance between a respective laser and its complementary multilayer reflector via a processor. The processor may be part and parcel to the laser rangefinder or it may be supplanted or supplemented by another or additional processing power. The processor may be a finite state machine, a digital processor or a microprocessor.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims and their equivalents.

What is claimed is:

1. A football down marker system, comprising:
   a first pole bearing a first laser, a first multilayer reflector, a first level and a first processor; and
   a second pole bearing a second laser, a second multilayer reflector, a second level and a second processor,
   wherein the first laser is complementary to the second multilayer reflector and the second laser is complementary to the first multilayer reflector, and
   wherein each processor calculates an average distance between a respective laser and its complementary multilayer reflector.

2. The system of claim 1, further comprising each processor calculating an average distance until processor averages match within a predetermined percentage.

3. The system of claim 1, further comprising each processor configured to calculate a difference between a laser incidence on a first layer versus incidence on a second layer of the multilayer reflectors.

4. The system of claim 1, further comprising each processor is configured to calculate a distance via a time a laser takes to travel from a laser to a receiving multilayer reflector and reflected back again.

5. The system of claim 1, wherein the first and the second lasers are disposed orthogonally on respective poles.

6. The system of claim 1, wherein the first and the second levels indicate an uprightness of the first and the second poles with respect to each other.

7. The system of claim 1, further comprising a flip sign disposed on at least one of the poles to indicate a first, a second, a third or a fourth down.

8. The system of claim 1, further comprising a third pole and a fourth pole, each pole bearing at least a laser, a multilayer reflector and a level.

9. The system of claim 1, further comprising an advertisement placed on at least one of the two poles.

10. The system of claim 1, wherein the complementarity is based on a line of sight between a respective laser and a respective multilayer reflector.

11. A method for determining football yardage, comprising:
    bearing a first laser, a first multilayer reflector, a first level and a first processor on a first pole;
    bearing a second laser, a second multilayer reflector, a second level and a second processor on a second pole;
    disposing the first laser complementary to the second multilayer reflector and the second laser complementary to the first multilayer reflector, and
    calculating an average distance between a respective laser and its complementary multilayer reflector via a processor.

12. The method of claim 11, further comprising each processor calculating an average distance until processor averages match within a predetermined percentage.

13. The method of claim 11, further comprising each processor calculating a difference between a laser incidence on a first layer versus incidence on a second layer of the multilayer reflectors.

14. The method of claim 11, further comprising each processor calculating a distance via a time a laser takes to travel from a laser to a receiving multilayer reflector and reflected back again.

15. The method of claim 11, further comprising disposing the first and the second lasers and the first and second multilayer reflectors orthogonally on respective poles.

16. The method of claim 11, further comprising indicating an uprightness of the first and the second poles with respect to each other via the first and the second levels.

17. The method of claim 11, further comprising bearing at least an additional laser, an additional multilayer reflector and an additional level via a third pole and a fourth pole.

18. The method of claim 11, further comprising disposing an advertisement on at least one of the two poles.

19. The method of claim 11, further comprising establishing the complementarity based on a line of sight between a respective laser and a respective multilayer reflector.

20. A football down marker system, comprising:

a first pole bearing a first laser, a first multilayer reflector, a first level and a first processor; and a second pole bearing a second laser, a second multilayer reflector, a second level and a second processor, wherein the first laser is complementary to the second multilayer reflector and the second laser is complementary to the first multilayer reflector, and wherein each processor calculates an average distance between a respective laser and its complementary multilayer reflector, and wherein each processor calculates a difference between a laser incidence on a first layer versus incidence on a second layer of the multilayer reflectors to determine a line of sight by a coincidence of the incidence.

* * * * *